(12) United States Patent
Cain et al.

(10) Patent No.: US 7,016,685 B1
(45) Date of Patent: Mar. 21, 2006

(54) SYSTEM AND METHODS OF DYNAMIC LOAD BALANCING ACROSS PROCESSOR NODES

(75) Inventors: Thomas A. Cain, Plano, TX (US); Eliot B. Rosen, Plano, TX (US); Rajakumar V. Badri, Plano, TX (US); Allen C. Wah, Plano, TX (US); Joe Q. Vu, Plano, TX (US); Matthew C. Perry, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 169 days.

(21) Appl. No.: 09/645,970

(22) Filed: Aug. 24, 2000

(51) Int. Cl.
*H04Q 7/20* (2006.01)
*H04M 5/00* (2006.01)

(52) U.S. Cl. .................. 455/453; 455/507; 379/269

(58) Field of Classification Search ........... 455/453, 455/438, 525, 422, 507, 432, 442, 443, 436, 455/450, 449; 370/209, 331, 335, 321, 337, 370/229; 379/112.04, 112.01, 269
See application file for complete search history.

(56) References Cited

U.S. PATENT DOCUMENTS

| | | | | |
|---|---|---|---|---|
| 4,974,256 A | * | 11/1990 | Cyr et al. | 455/453 |
| 6,055,433 A | * | 4/2000 | Yuan et al. | 455/453 |
| 6,069,871 A | * | 5/2000 | Sharma et al. | 370/209 |
| 6,128,500 A | * | 10/2000 | Raghavan et al. | 455/453 |
| 6,129,604 A | * | 10/2000 | Maveddat et al. | 455/453 |
| 6,141,559 A | * | 10/2000 | Neumiller et al. | 455/525 |
| 6,385,449 B1 | * | 5/2002 | Eriksson et al. | 455/436 |
| 6,577,871 B1 | * | 6/2003 | Budka et al. | 455/453 |

* cited by examiner

*Primary Examiner*—Rafael Perez-Gutierrez
(74) *Attorney, Agent, or Firm*—Haynes and Boone, LLP

(57) ABSTRACT

A method of dynamically balancing work among a plurality of processing nodes is provided. The method includes the steps of periodically updating a node occupancy value at each of the plurality of processing nodes, communicating the respective node occupancy value of each processing node to at least one work originator node, storing the node occupancy values of the plurality of processing nodes at the at least one work originator node, and selecting, by the at least one work originator node, a processing node to perform a particular task in response to the node occupancy values of the processing nodes.

32 Claims, 2 Drawing Sheets

SYSTEM AND METHODS OF DYNAMIC LOAD BALANCING ACROSS PROCESSOR NODES

TECHNICAL FIELD OF THE INVENTION

This invention relates to distributed processing, and more particularly, to a system and method of dynamic load balancing across processor nodes.

BACKGROUND OF THE INVENTION

In distributed processing architectures, multiple processing nodes share the work load according to some predefined load balancing algorithm. Conventional methods include round robin or weighted round robin, for example, which assign work to the processing nodes in a static or fixed manner. Furthermore, conventional methods do not fully and effectively utilize the additional processing power of improved processing nodes because the added capability or efficiency of these nodes are typically not taken into account in balancing the work load. For example, a system may include four processing nodes with different processing capacity, perhaps due to the different vintage of the processors, with the new processors having improved capacity. Static load balancing methods do not assign more work to those processor nodes with higher capacity to take advantage of the added computing power. To fully exploit the continuous increases in processing power of newer computer processor designs, work load balancing should allow processor cluster expansions and upgrades with higher capacity processor nodes while not requirement replacement or retirement of existing older processing nodes.

SUMMARY OF THE INVENTION

Therefore, it is desirable to provide a dynamic load balancing methodology which assigns work to multiple processing nodes so that the nodes function at an approximately equal percentage of each node's full processing capacity in order to fully take advantage of the processing capacities of the processing nodes.

In accordance with an embodiment of the present invention, a method of dynamically balancing work among a plurality of processing nodes is provided. The method includes the steps of periodically updating a node occupancy value at each of the plurality of processing nodes, communicating the respective node occupancy value of each processing node to at least one work originator node, storing the node occupancy values of the plurality of processing nodes at the at least one work originator node, and selecting, by the at least one work originator node, a processing node to perform a particular task in response to the node occupancy values of the processing nodes.

In accordance with another embodiment of the present invention, a method of dynamically balancing call processing tasks among a plurality of call processing nodes in a telecommunications switch is provided. The method includes the steps of periodically updating a node occupancy value at each of the plurality of call processing nodes, communicating the respective node occupancy value of each call processing node to at least one work originator node operable to receive incoming calls, storing the node occupancy values of the plurality of call processing nodes at the at least one work originator node, and selecting, by the at least one work originator node, a call processing node to process the incoming call in response to the node occupancy values of the call processing nodes.

In accordance with yet another embodiment of the present invention, a telecommunications system is provided. The telecommunications system includes a plurality of call processing nodes and at least one incoming call receiving node. The plurality of call processing nodes each periodically calculates and updates a respective node occupancy value, and communicates the respective node occupancy value to at least one incoming call receiving node. The at least one incoming call receiving node stores the node occupancy values of the plurality of call processing nodes, and selects a call processing node to process the incoming call in response to the stored node occupancy values of the call processing nodes.

The present invention thus dynamically balances the processing load of the processing nodes as a percentage or relative to the total capacity. As a result, the work load can be more evenly and more intelligently distributed to fully take advantage the higher capacity of newer and faster computer processing technology. Because the node occupancy information is communicated in the message header of existing message traffic, little or no overhead is expended to accomplish this task. The use of an open loop feedback design versus a closed loop feedback design provides a more flexible load balancing scheme. In addition, each node in the system is able to calculate its own occupancy rate in the manner best suited to that particular node or best for overall system performance.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 1:
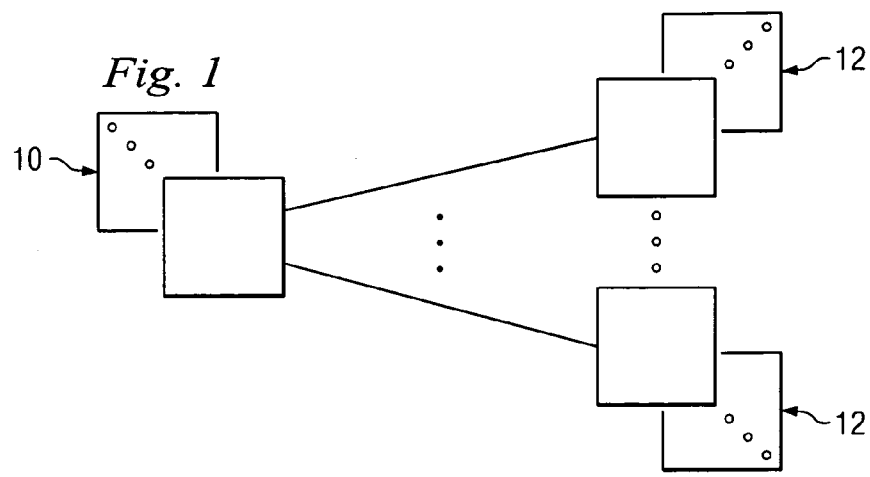
FIG. 1 is a simplified block diagram of a distributed processing system containing work originators and work performers.

FIG. 1 is a simplified block diagram of a distributed processing system containing work originators 10 and work performers 12. Work originators 10 and work performers 12 may be computing platforms, processor-based devices, or any equipment or processes that are capable of carrying out a logical sequence of steps. Work originators 10 may receive requests for work from other devices (not shown) via networks and are operable to assign work to one or more work performers 12. Work performers 12 operate in a load-sharing manner so that any one work performer 12 does not become overwhelmed with work.

In systems that have processing nodes that have dissimilar processing capacities, traditional static load balancing methods do not take full advantage of the higher processing power of the processors. Typically, the processing capacity of processing nodes are used to execute operating system and application support software, standby applications, active applications, and load-shared applications. The amount of processing capacity used for these applications typically vary among the processing nodes because different set of applications may run on different processing nodes, which may also change over time. The processing capacities used for the applications are also different due to the different processing power of the nodes. Therefore, assigning a discrete unit of work to one processing node may cause its work load to change by X %, while the same unit of work may cause another processing node to change its work load by Y %. Therefore, load balancing methods that rely on units of work or a round robin scheme do not fully exploit the higher processing power of newer processing nodes.

In an embodiment of the present invention, the work load is shared among work performers 12 so that each work performer 12 functions at more or less an equal percentage of its own full capacity. Work originators 10 and work performers 12 communicate by inter-node messaging. In the present invention, the status of each work performer's work load is inserted into each inter-node message originating from that work performer destined for a work originator. Each work originator 10 maintains a record of all work performer's current load condition and consults this record whenever work needs to be assigned to a work performer. On the basis of the work load record, a work performer is selected and assigned the new work. This load balancing scheme is an open loop feedback design that dynamically assigns work based on the percentage of capacity available to do the work at each work performer. Details of the invention are described below.

Figure 2:
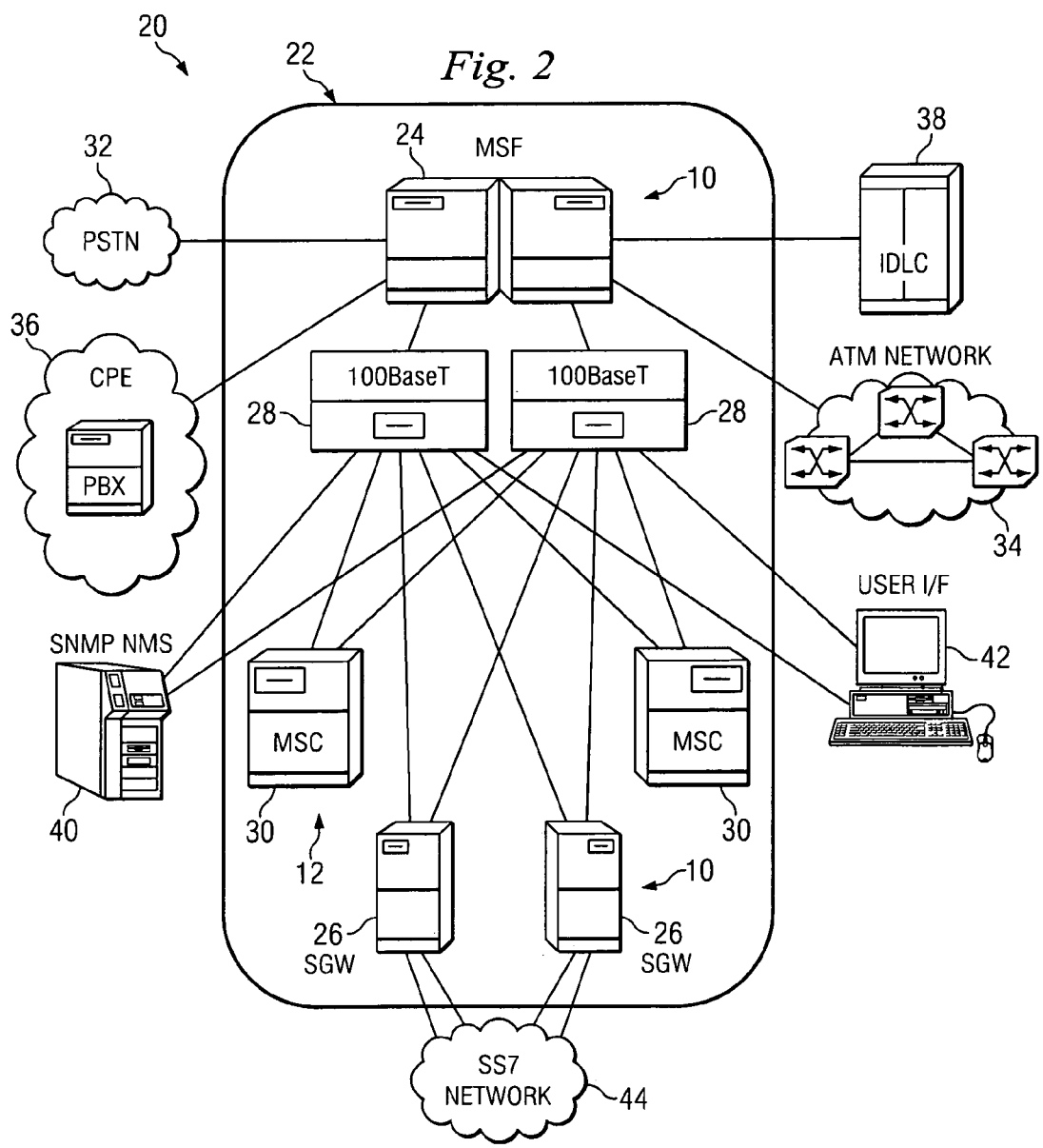
FIG. 2 is a simplified block diagram of a distributed processing system set in a telecommunications environment.

FIG. 2 is a simplified block diagram of a distributed processing system 22 set in a telecommunications environment 20. In particular, system 22 is an integrated media switching platform. System 22 includes work originators 10, which are multi-service fabric (MSF) 24 and signaling gateways (SGW) 26. System 22 also includes work performers 12, which are multi-service controllers (MSC) 30 coupled to work originators 10 via networks, network servers and/or network switches 28. Network servers 28 may be Ethernet switches, for example. Work originators 10 interface with public switched telephone network (PSTN) 32, asynchronous transfer mode (ATM) network 34, customer premises equipment (CPE) 32 such as a private branch exchange (PBX) 36, integrated digital loop carrier (IDLC) 38, simple network management protocol (SNMP) network management system (NMS) 40, user interface (I/F) 42, and other network nodes. System 22 may also interface with an SS7 network 44. As voice data calls are being originated, work originators 10 select a work performer 12 to handle the call based on its current work load. The work load is distributed so that the work performers all perform at substantially the same percentage of each processor's full capacity.

Figure 3:
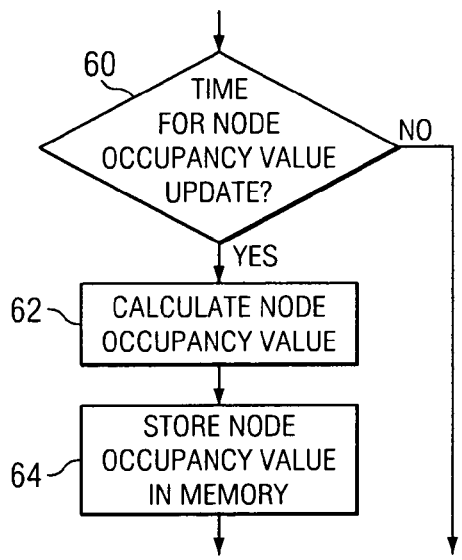
FIG. 3 is a flowchart of node occupancy value calculation according to an embodiment of the teachings of the present invention.

FIG. 3 is a flowchart of node occupancy value calculation according to an embodiment of the teachings of the present invention. Each work performer is operable to calculate or otherwise determine its own occupancy rate or value. In one embodiment, the node occupancy value is determined on a periodic basis, as shown in block 60. If it is time to calculate or determine the current occupancy value, then it is calculated according to a predefined method or formula, as shown in block 62. A combination of percentage of processor occupancy and the length of the incoming work queue are factors that can be used to calculate the occupancy value. For example, a processing node may calculate its node occupancy value by:

$$Processor\_Occupancy\%*n + Pending\ Queue\_Length*m,$$

where n and m are tuning factors; for example, n=0.8 and m=1 in one embodiment. On the other hand, another processing node may be instructed to output a high occupancy value rather than to make a true determination in order to keep out new work because it is currently testing a new software load, for example. All processing nodes in a system may use the same calculation method, or different processing nodes may use different methods in the manner best suited to each individual node. As a further example, the occupancy value calculation may provide hysteresis to smooth the resultant output to avoid large swings in the node occupancy value. The newly determined node occupancy value is then stored or used to update a known memory location, as shown in block 64.

Figure 4:
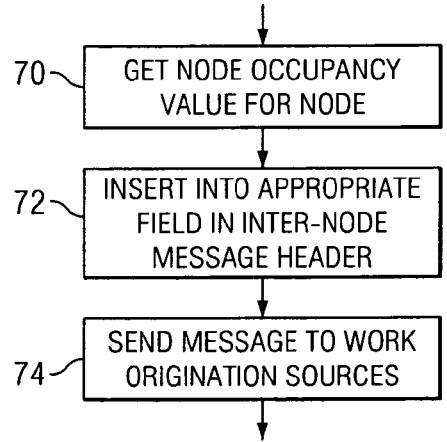
FIG. 4 is a flowchart of sending an inter-node message containing a node occupancy value according to an embodiment of the teachings of the present invention.

FIG. 4 is a flowchart of sending an inter-node message containing a node occupancy value according to an embodiment of the teachings of the present invention. A work performer, during the normal course of events, communicates with work originators by sending inter-node messages. For every message a work performer sends, it sends a status of its current work load. In blocks 70 and 72, the work performer reads the current node occupancy value and insert the value into a appropriate predetermined location or field in the message header of an inter-node message. Also included in the header is sender ID or address and recipient ID or address. The message is then sent to the destination, as shown in block 74. In this manner, the recipient of the message is provided a current status of the work load of the sender work performer.

Figure 5:
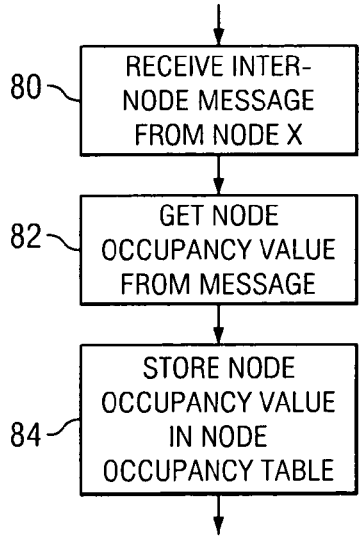
FIG. 5 is a flowchart of receiving an inter-node message containing a node occupancy value according to an embodiment of the teachings of the present invention.

FIG. 5 is a flowchart of receiving an inter-node message containing a node occupancy value according to an embodiment of the teachings of the present invention. A work originator receives an inter-node message from another node or a work performer, as shown in block 80. The work originator extracts the node occupancy value from the predefined field in the message header as well as the sender node's unique ID or address, as shown in block 82. The node occupancy value is then stored in a node occupancy table indexable by the node IDs, as shown in block 84. The node occupancy table is stored in the respective memory of each work originator node.

Figure 6:
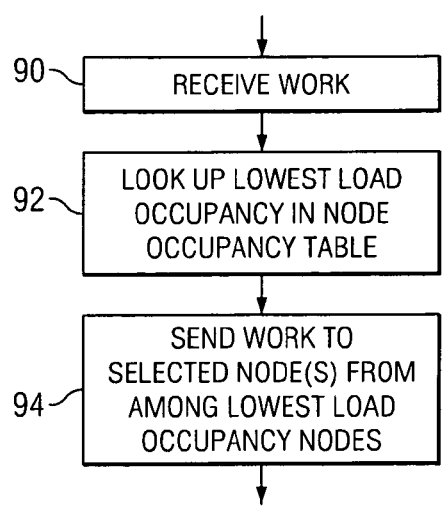
FIG. 6 is a flowchart of selecting a processing node according to the node occupancy values according to an embodiment of the teachings of the present invention.

FIG. 6 is a flowchart of selecting a processing node according to the node occupancy values according to an embodiment of the teachings of the present invention. A work originator receives work from an external source or another node in the network, as shown in block 90. For example, work may be in the form of signaling data and voice data for a telephony call received by multi-service fabric 24 and signaling gateway 26. As part of the process of selecting a work performer to handle the work, the work originator reads the node occupancy table to determine which work performer(s) is(are) capable of handling the work and is(are) among the lowest in terms of occupancy status, and sends the work to the selected node(s), as shown in blocks 92 and 94. In one exemplary embodiment, the work originator may randomly select a node from the lowest occupied third of the available processing nodes. The work performer then sends a request to the selected work performer to perform the task. For example, multi-service fabric 24 prepares and sends a call setup message to the selected work performer so that it may handle the incoming call.

When the work performer is chosen in this manner, the dynamic work processing load for each work performer as a percentage or relative to the total capacity is taken into account. As a result, the work load can be more evenly and more intelligently distributed to fully take advantage of the higher capacity of newer and faster work performers. Because the node occupancy information is communicated in the message header of existing message traffic, little or no overhead is expended to accomplish this task. The use of an open loop feedback design versus a closed loop feedback design provides a more flexible load balancing scheme. Each node in the system is capable of calculating its own occupancy rate in the manner best suited to that node or best for overall system performance.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. In connection with a telecommunications switch having a switching fabric through which calls are switched, and with a plurality of processing nodes each capable of performing certain processing in connection with calls to be routed through the switching fabric, a method of dynamically balancing call processing tasks among the plurality of call processing nodes, comprising:
   periodically updating a respective node processing occupancy value at each of the plurality of call processing nodes;
   communicating the respective node occupancy value of each call processing node to at least one work originator node operable to receive incoming calls;
   storing the node occupancy values of the plurality of call processing nodes at the at least one work originator node; and
   selecting, by the at least one work originator node, a call processing node to process the incoming call in response to the node occupancy values of the call processing nodes;
   wherein selecting a call processing node comprises:
      determining a subset of call processing nodes having lowest node occupancy values; and
      randomly selecting a call processing node from the subset.

2. The method, as set forth in claim 1, wherein periodically updating the node occupancy value comprises calculating the node occupancy value, by each of the plurality of call processing nodes, using a percentage of available processing capacity of the call processing node.

3. The method, as set forth in claim 1, wherein periodically updating node occupancy value comprises calculating the node occupancy value, by each of the plurality of call processing nodes, using a combination of a percentage of available processing capacity of the call processing node and a length of its work queue.

4. The method, as set forth in claim 1, wherein periodically updating node occupancy value comprises calculating the node occupancy value, by each of the plurality of call processing nodes, using a combination of a percentage of available processing capacity of the call processing node, a length of its work queue, and its processing speed.

5. The method, as set forth in claim 1, wherein communicating the respective node occupancy value comprises:
   inserting the respective node occupancy value into a message header of a call processing message; and
   sending the message to the work originator node.

6. The method, as set forth in claim 1, wherein communicating the respective node occupancy value comprises sending a call processing message containing the respective node occupancy value as a part of existing call processing message traffic.

7. The method, as set forth in claim 1, wherein communicating the respective node occupancy value comprises:
   inserting the respective node occupancy value and a sender ID into a message header of an existing message; and
   sending the message to the work originator node.

8. The method, as set forth in claim 7, wherein storing the node occupancy values of the plurality of call processing nodes comprises storing the node occupancy value in a table indexable by the sender ID.

9. The method, as set forth in claim 1, wherein determining the subset of processing nodes having lowest node occupancy values comprises:
   determining a subset of call processing nodes having the lowest third node occupancy values.

10. A load shared processing system distributed among a plurality of processing nodes,
   each of the plurality of processing nodes executing a shared process for switching fabrics,
   each of the plurality of processing nodes in communication with one or more work origination nodes for performing tasks associated with switching taking place in one or more switching fabrics;
   wherein each of the plurality of processing nodes executes a second process for periodically determining an indication of processing occupancy of the node, and communicates an indication of the occupancy to the at least one work origination node;
   and wherein each of the one or more work origination nodes executes a process for storing the indication of the processing occupancy received from each of the plurality of processing nodes and for selecting one of the plurality of processing nodes for handling a task to be performed by the shared process based on the stored indications of processing occupancy of the plurality of nodes, wherein the selected one of the plurality of processing nodes is selected randomly from a subset of the plurality of processing nodes having lowest occupancies relative to the remaining plurality of processing nodes.

11. The load shared processing system of claim 10, wherein each of the plurality of processing nodes is comprised of a multi-service fabric controller and each of the one or more work origination nodes is comprised of a multi-service fabric for telecommunications services.

12. The load shared processing system of claim 10, wherein the one or more work original nodes and the plurality of processing nodes communicate by exchanging messages, and wherein at least certain of the messages communicated by each of the plurality of processing nodes to the one or more telecommunications switches includes an indication of that processing node's load.

13. The load shared processing system of claim 12, wherein each of the certain messages sent by the plurality of processing nodes includes a header that includes a field for storing the indication of the processing load of the one of the plurality of processing nodes sending the message.

14. The load shared processing system of claim 13, wherein the certain messages include call set up messages.

15. The load shared processing system of claim 10, wherein the processing occupancy of a processing node indicates an ability of the processing node to process additional work.

16. A method of dynamically balancing work to be performed by a process distributed among a plurality of processing nodes, comprising:
   periodically updating a node processing occupancy value at each of the plurality of processing nodes;
   communicating the respective node occupancy value of each processing node to at least one work originator node;
   storing the node occupancy values of the plurality of processing nodes at the at least one work originator node; and
   selecting, by the at least one work originator node, a processing node to perform a particular task in response to the node occupancy values of the processing nodes;
   wherein selecting a processing node comprises:
      determining a subset of processing nodes having lowest node occupancy values; and
      randomly selecting a processing node from the subset.

17. The method, as set forth in claim 16, wherein periodically updating node occupancy value comprises calculating the node occupancy value, by each of the plurality of processing nodes, using a percentage of available processing capacity of the processing node.

18. The method, as set forth in claim 16, wherein periodically updating node occupancy value comprises calculating the node occupancy value, by each of the plurality of processing nodes, using a combination of percentage of available processing capacity of the processing node and a length of its work queue.

19. The method, as set forth in claim 16, wherein periodically updating node occupancy value comprises calculating the node occupancy value, by each of the plurality of processing nodes, using a combination of percentage of available processing capacity of the processing node, a length of its work queue, and its processing speed.

20. The method, as set forth in claim 16, wherein communicating the respective node occupancy value comprises:
   inserting the respective node occupancy value into a message header of an existing message; and
   sending the message to the work originator node.

21. The method, as set forth in claim 16, wherein communicating the respective node occupancy value comprises sending a message containing the respective node occupancy value as a part of existing message traffic.

22. The method, as set forth in claim 16, wherein communicating the respective node occupancy value comprises:
   inserting the respective node occupancy value and a sender ID into a message header of an existing message; and
   sending the message to the work originator node.

23. The method, as set forth in claim 22, wherein storing the node occupancy values of the plurality of processing nodes comprises storing the node occupancy value in a table indexable by the sender ID.

24. The method, as set forth in claim 16, wherein determining the subset of processing nodes having lowest node occupancy values comprises:
   determining a subset of processing nodes having the lowest third node occupancy values.

25. A telecommunications system, comprising:
   a plurality of call processing nodes for communicating with a switching fabric through which calls are switched; and
   at least one incoming call receiving node;
   the plurality of call processing nodes each:
      periodically calculating and updating a respective node occupancy value; and
      communicating the respective node occupancy value to at least one incoming call receiving node, communication of the occupancy value made in an open-loop manner;
   the at least one incoming call receiving node:
      storing the node occupancy values of the plurality of call processing nodes;
      determining a subset of call processing nodes having lowest node occupancy values; and
      selecting randomly from the subset a call processing node to process the incoming call.

26. The telecommunications system, as set forth in claim 25, wherein the plurality of call processing nodes calculates the respective node occupancy value using a percentage of available processing capacity of the call processing node.

27. The telecommunications system, as set forth in claim 25, wherein the plurality of call processing nodes calculate the respective node occupancy value using a combination of a percentage of available processing capacity of the call processing node and a length of its work queue.

28. The telecommunications system, as set forth in claim 25, wherein the plurality of call processing nodes insert the respective node occupancy value into a message header of a call processing message, and send the message to the incoming call receiving node.

29. The telecommunications system, as set forth in claim 25, wherein the plurality of call processing nodes send a call processing message containing the respective node occupancy value as a part of existing call processing message traffic.

30. The telecommunications system, as set forth in claim 25, wherein the plurality of call processing nodes insert the respective node occupancy value and a sender ID into a message header of a call processing message, and send the call processing message to the incoming call receiving node.

31. The telecommunication system, as set forth in claim 30, wherein the at least one incoming call receiving node stores the node occupancy value in a table indexable by the sender ID.

32. The telecommunications system, as set forth in claim 25, wherein the subset of call processing nodes has the lowest third node occupancy values.

* * * * *